United States Patent
Agrawal et al.

(10) Patent No.: US 9,131,010 B2
(45) Date of Patent: Sep. 8, 2015

(54) DELAY-TOLERANT AND LOSS-TOLERANT DATA TRANSFER FOR MOBILE APPLICATIONS

(71) Applicant: NEC Laboratories America, Inc., Princeton, NJ (US)

(72) Inventors: Nitin Agrawal, Brunswick, NJ (US); Akshat Aranya, Jersey City, NJ (US); Cristian Ungureanu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 181 days.

(21) Appl. No.: 13/874,850

(22) Filed: May 1, 2013

(65) Prior Publication Data

US 2014/0115406 A1 Apr. 24, 2014

Related U.S. Application Data

(60) Provisional application No. 61/716,162, filed on Oct. 19, 2012.

(51) Int. Cl.
| | |
|---|---|
| G06F 11/00 | (2006.01) |
| H04L 29/08 | (2006.01) |
| H04L 29/06 | (2006.01) |

(52) U.S. Cl.
CPC .............. *H04L 67/325* (2013.01); *H04L 67/06* (2013.01); *H04L 69/24* (2013.01); *H04L 67/1095* (2013.01); *Y02B 60/50* (2013.01)

(58) Field of Classification Search
USPC ......................................................... 714/4.1
See application file for complete search history.

(56) References Cited

U.S. PATENT DOCUMENTS

| | | | | |
|---|---|---|---|---|
| 5,726,985 | A * | 3/1998 | Daniel et al. | 370/382 |
| 5,926,481 | A * | 7/1999 | Wang et al. | 370/465 |
| 6,137,793 | A * | 10/2000 | Gorman et al. | 370/360 |
| 6,389,031 | B1 * | 5/2002 | Chao et al. | 370/412 |
| 6,535,512 | B1 * | 3/2003 | Daniel et al. | 370/395.1 |
| 6,597,689 | B1 * | 7/2003 | Chiu et al. | 370/354 |
| 6,661,797 | B1 * | 12/2003 | Goel et al. | 370/395.21 |
| 6,934,249 | B1 * | 8/2005 | Bertin et al. | 370/218 |
| 6,975,656 | B1 * | 12/2005 | Madhavapeddi et al. | 370/518 |
| 8,255,482 | B2 * | 8/2012 | McColgan et al. | 709/217 |
| 2001/0018711 | A1 * | 8/2001 | Morris | 709/229 |
| 2001/0033575 | A1 * | 10/2001 | Shimamura et al. | 370/419 |
| 2004/0066760 | A1 * | 4/2004 | Thubert et al. | 370/329 |
| 2004/0210329 | A1 * | 10/2004 | Chen et al. | 700/94 |
| 2005/0129054 | A1 * | 6/2005 | Venkatachalam et al. | 370/458 |
| 2008/0144632 | A1 * | 6/2008 | Rabie et al. | 370/395.5 |
| 2009/0164657 | A1 * | 6/2009 | Li et al. | 709/233 |
| 2010/0017528 | A1 * | 1/2010 | Awano | 709/230 |
| 2010/0094930 | A1 * | 4/2010 | Griff et al. | 709/203 |
| 2011/0170410 | A1 * | 7/2011 | Zhao et al. | 370/232 |

(Continued)

*Primary Examiner* — Kamini Patel
(74) *Attorney, Agent, or Firm* — Joseph Kolodka

(57) ABSTRACT

A method supports data communication in a mobile application by specifying in the mobile application a program intent and one or more course or fine-grained properties of data objects in terms of tolerance to delay and loss; selecting a transfer policy for a set of data objects based on the application intent; receiving and coalescing intents of one or more applications for object data for the one or more applications; crafting an aggregate transfer policy, and communicating data from one or more applications as an aggregate based on the aggregate transfer policy to programmatically incorporate and benefit from tolerance to delay in the transfer of data.

20 Claims, 4 Drawing Sheets

(56) References Cited

U.S. PATENT DOCUMENTS

| | | |
|---|---|---|
| 2011/0194539 A1* | 8/2011 | Blasinski et al. ............. 370/336 |
| 2012/0023190 A1* | 1/2012 | Backholm et al. ............ 709/217 |
| 2012/0135726 A1* | 5/2012 | Luna et al. ................. 455/422.1 |
| 2012/0201186 A1* | 8/2012 | Awano ........................... 370/312 |
| 2012/0240238 A1* | 9/2012 | Gates et al. ..................... 726/26 |
| 2012/0324041 A1* | 12/2012 | Gerber et al. ................. 709/217 |
| 2013/0159452 A1* | 6/2013 | Saldana De Fuentes et al. ............................ 709/213 |
| 2013/0163431 A1* | 6/2013 | Backholm et al. ............. 370/235 |
| 2014/0130090 A1* | 5/2014 | Krikorian ........................ 725/37 |
| 2014/0130116 A1* | 5/2014 | Krikorian ...................... 725/139 |
| 2014/0146693 A1* | 5/2014 | Chetlur et al. ................. 370/252 |
| 2014/0279901 A1* | 9/2014 | Agrawal et al. ............... 707/634 |
| 2014/0317055 A1* | 10/2014 | Agrawal et al. ............... 707/627 |
| 2014/0348186 A1* | 11/2014 | Ogata et al. ................... 370/508 |
| 2015/0023162 A1* | 1/2015 | Alisawi et al. ................ 370/230 |

* cited by examiner

DELAY-TOLERANT AND LOSS-TOLERANT DATA TRANSFER FOR MOBILE APPLICATIONS

This application is a non-provisional of Provisional Application Ser. No. 61/716,162 filed on Oct. 19, 2012 the content of which is incorporated by reference.

BACKGROUND

The present invention relates to mobile application programming.

Mobile devices are quickly becoming the de-facto means to access, process, and even generate significant amounts of data. A study by Cisco suggests a strong growth in mobile data traffic, more than doubling every year for the past four years; the study also provides evidence for a strong growth potential in the number of smartphone subscribers. Several recent articles have noted that the strain of data-intensive devices may place additional pressure on mobile operators as they build out faster networks. Mobile users are using their smartphones and tablets to view movies, download photo albums, and follow news, email, and Facebook feeds, often many at the same time.—downloading books, watching videos and photos, and feeds for news, stocks, and social networks. Today, mobile devices are moving away from While demand for data services is on the rise, end-user resources (e.g., device battery life, cellular data usage) and operator resources (e.g., mobile network bandwidth) are still constrained. Mobile data usage is on a tremendous rise, due not only to increasing number of users but also to an increase in the number of applications that transfer data over the network. 0 Moreover, applications for sharing, sensing, and collaboration have become more popular, causing significant amounts of data to be generated on devices. Managing this data—syncing it to the cloud, or with other users or devices—is a crucial and often challenging part of writing mobile apps and services. In spite of plenty of good advice and best practices from OS vendors and network operators, storing and transferring mobile data is fraught with issues. On the one hand, an app developer needs to worry about the semantics of data storage and synchronization, while on the other, about the end-user experience, which is impacted by poor and intermittent network connectivity.

This insatiable hunger for mobile data has been spurred in large parts due to a surge in apps requiring faster connectivity and more bandwidth to connect to cloud services. Mobile users are also undergoing a sea-change from being consumers to producers of data, as collaborative and sensor-based applications become more popular. From healthcare monitoring to instant polling for TV shows, mobile users are generating far more data than ever before.

While human-generated data (i.e., emails, calendar entries) is small, on-board and externally connected sensors lead to a number of apps continually generating data and pushing it to cloud services for further analysis or backup. Examples of such apps include vehicular traffic monitoring, continuous medical monitoring through specialized sensors, and location-based services. Such apps are growing in utility and popularity, shifting the balance from the once "download-heavy" nature of mobile apps.

Downlink data is growing too. Better displays on smartphones and tablets are overcoming the handicap of the small screen size; users are increasingly relying on their mobile devices to access a variety of audio, video, and textual content. Several mobile apps operate as readers for RSS or news feeds, and periodically download data to the device; such periodic sync apps account for a large fraction of the total network connections.

While data needs of mobile apps are on the rise, several factors limit the overall mobile experience for users of such apps. First, battery life on most mobile devices continues to be limited; significant increase in battery life is not expected in the near future and power management is still extremely important to end users. Second, network operators are scrambling to increase capacity to match growing demands and expectations; growth in the number of mobile users and increased activity per user has placed a huge burden on the mobile network infrastructure. Third, cost of cellular data is still high in most countries; with low-spec smartphones gaining traction, the requirements of even greater number of mobile users needs to be met.

Since the majority of apps are responsible for their own data transfer, they fail to benefit from optimizations such as compression and deduplication that are much more effective on larger chunks of data. Both iOS and Android provide extensive "best practices" and programming guidelines that developers are expected to adhere to when it comes to local and network I/O; network operators like AT&T provide their own. The recommendations although beneficial when applied to individual apps, fail to incorporate any benefits from cross-app optimizations.

Apps that need to synchronize and share data between mobile users and the cloud end up having to individually design and implement the sync mechanisms: managing data transfers, handling network failures and process crashes, and even more onerous—detecting and resolving conflicts, and propagating changes to other users in a timely fashion. Efficient usage of network resources is also challenging. Individual apps transfer frequently enough that even with a small number of bytes at a time, the cellular radio is kept on for extended periods of time; uncoordinated transfers across apps further increase the frequency of the radio being awake.

SUMMARY

A method supports data communication in a mobile application by specifying in the mobile application a program intent and one or more course or fine-grained properties of data objects in terms of tolerance to delay and loss; selecting a transfer policy for a set of data objects based on the application intent; receiving and coalescing intents of multiple applications for object data for the multiple applications; crafting an aggregate transfer policy, and communicating data from multiple applications as an aggregate based on the aggregate transfer policy to programmatically incorporate and benefit from tolerance to delay in the transfer of data.

Advantages of the preferred embodiments may include one or more of the following. The system improves network efficiency. This is beneficial to network and mobile operator (such as ATT, Docomo, and others) by reducing the load on mobile networks. The system reduces transmission cost. This benefits end users by reducing their network data consumption and consequently their monthly data charges. The system results in high energy efficiency and benefits the end user by reducing battery drain. For developers, the system provides ease of writing new applications for mobile devices, especially the class of data-centric applications that are tolerant to data being delayed or lost. The system reduces congestion at the servers of a cloud service provider by dropping/delaying data at times of heavy load.

DESCRIPTION

Figure 1:
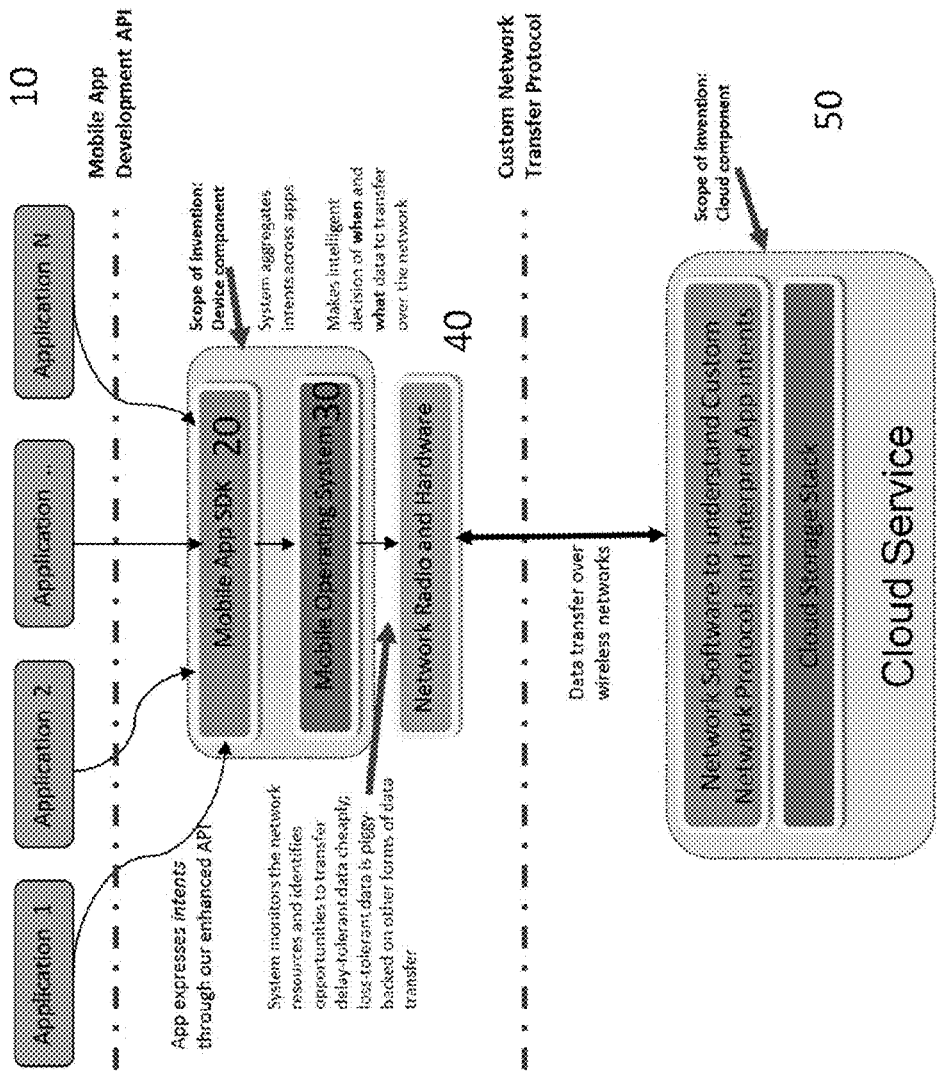
FIG. 1 shows an exemplary mobile communication environment.
Figure 2:
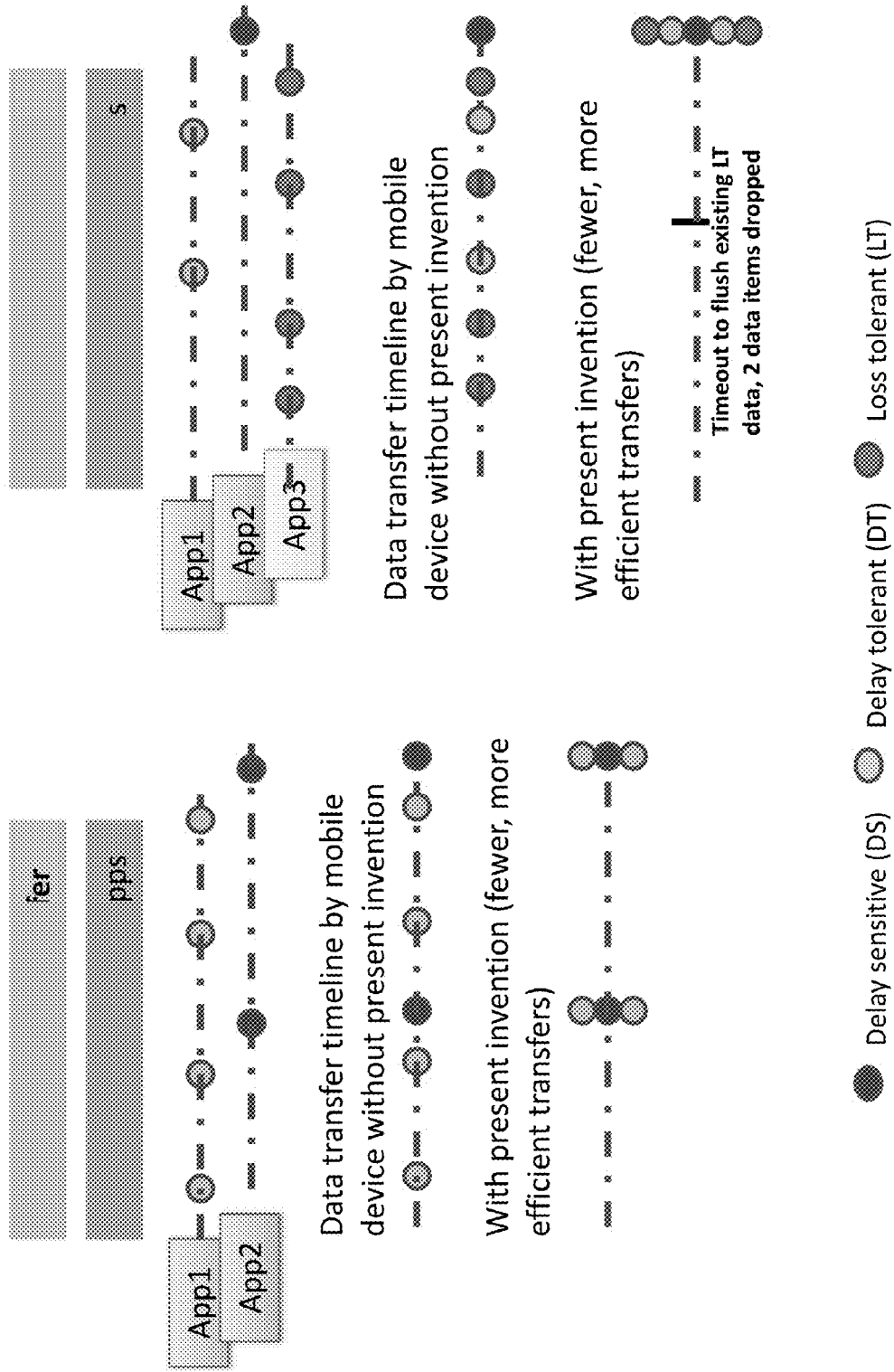
FIG. 2 shows exemplary comparisons between conventional and Mobius for delay tolerant situations and loss tolerant situations.

FIG. 1 shows an exemplary mobile communication environment. In this example, a plurality of applications 1-N 10 that conform to a mobile app software development kit (SDK) 20 and interacts with a mobile operating system 30. Each application (app) expresses intents through a custom application program interface (API). The system aggregates intents across apps and makes intelligent decision of when and what data to transfer over the network. The data communication is done using network radio and hardware 40. Data is transferred over a wireless network to a cloud service 50 that includes network software to interpret custom network protocol and app intents. The data is stored in a cloud storage rack.

The application provides hints to classify data into loss-tolerant, delay-tolerant categories; the categorization is done at the level of application objects which can be arbitrary sized. The application can put each individual object into a separate category or place all objects in the same category.

The system of FIG. 1 provides mobile application developers a mechanism to operate with data that is acceptable to delay or loss. Mobile application developers are presented with a richer API that enables them to specify to the system certain properties of individual data objects that were previously visible only to the app. An App writes to this API and specifies "intents" for delay and loss tolerances for individual or aggregate data objects. The underlying system will delay and/or drop application data in conformance with the specification. The client side system will throttle data based on several factors including network efficiency and energy consumption. While a single application may not always provide enough opportunity to conserve network resources/energy by itself, aggregating the intents of multiple applications leads to greater flexibility and thus provides for more efficient network utilization. The data transfer mechanism is that it combines the data traffic across applications and delays the delay-tolerant data of one application until forced to perform a network transfer due to delay sensitive data belonging to another application, or until enough delay-tolerant data has accumulated to warrant a transfer on its own.

Loss tolerant data is similarly piggy-backed on both delay-sensitive and delay-tolerant data; loss-tolerant data is not transferred unless a network transfer is being done in the context of some other type of data. If no data transfer is being made for a time interval, and if the maximum loss threshold for an application has not been reached, loss-tolerant data is simply discarded periodically. The system can decide to lose data at a number of places:

1. On the mobile device which generates the data and stores it in RAM alone and does not persist; data sample is lost upon shutdown, loss of battery, or simply evicted from the cache after a period of time determined by the system.
2. Discarded at the time of network transfer from the mobile device to conserve network resources and/or energy.
3. Discarded during ingest at the server to reduce server load and/or congestion.

The server side system can perform similar optimizations.

The system of FIG. 1 has two interfaces:

1. Mobile Application Development API is the interface provided to developers writing apps for mobile devices (e.g., Android devices come with an SDK, and a developer API); the proposed interface is richer than the traditional API, and allows an application to
    Specify course or fine-grained properties of data objects in terms of their tolerance to delay and loss
    Handle asynchronous events generated as a result of a data item being transferred or lost, if a notification is desired by the application.
2. Network transfer protocol, used internally between a mobile device and the cloud service. This protocol is the "secret sauce" of the invention, and provides the following features:
    Coalesce the intents of multiple applications for individual data objects or for the aggregate.
    Decide on the transfer policy for a set of data objects based on application intent.
Additional factors such as network type (Wifi or 3G), network characteristics, and server load, are among other system-wide metrics of interest that are used by the network transfer protocol to determine a schedule of when and what data objects to transfer
    Send optional hints for loss-tolerant data to be discarded on the server-side.
    Perform other optimizations (de-duplication, compression) to efficiently transfer data, as it deems fit, based on the type of data and other system-wide parameters. The delay-tolerant property of data and its reduction through our transfer protocol empowers such "data reduction" optimizations. By creating a larger window of opportunity through delay, more data objects can be packed into a single transfer. Larger transfer size offers additional opportunities for applying deduplication and compression.

There are two pieces of software that implement the set of features:

1. Client-side software on the mobile device implements both the developer API and the client-side component of the network transfer protocol
2. Server-side software running as a cloud service: implements the server-side component of the network transfer protocol. In addition, the server side software also mirrors most of the algorithmic logic of the client-side software in terms of delay and loss tolerant data transfer for the downstream traffic (transfer from server to client).

One implementation called Mobius provides a cloud storage and synchronization platform catering specifically to the needs of mobile apps and services. Mobius is designed to be easy to use: apps operate on data stored in tables, Mobius takes care of the data storage and synchronization. Mobius is also frugal: it works along multiple dimensions to meet the needs of apps while conserving mobile resources; its key design features are:

First, Mobius provides a simple and expressive API, resembling the create, read, update, delete (CRUD) operations familiar to mobile app developers; in addition, the API provides well-defined semantics for synchronization with the cloud. Mobius is designed to support multiple disconnected writers to the same table; it hides the complexities of local storage and network management, maintaining versions, caching, and notifications from the app developer. Second, Mobius allows apps to programmatically incorporate and benefit from tolerance to delay in the transfer of data. Third, Mobius employs data reduction techniques such as coalescing, compression, and piggybacking to reduce both the number of messages and bytes transferred over the network; it uses a single persistent connection between the device and the cloud, for all data, control, and notification messages. Fourth, by working across apps, Mobius creates additional opportunities for optimizations and applying the data reduction techniques. Finally, the Mobius Cloud can host the server component of the apps; server apps can access data through a CRUD API similar to the client.

Mobius frees the app developers from much of the burdens of managing data, enabling them to use the functionality they require while delegating to Mobius the responsibility of efficient, reliable data storage and transfer. Mobius implementation streamlines the mobile data transfer pattern of individual devices from frequent transfers to less frequent ones, which benefits both the mobile device, by potentially requiring fewer radio-on transitions, and the network providers. Cross-app compression also reduces the total amount of network data. End-users benefit with reduced network activity translating to lower usage costs, and efficient transfers enhancing battery life. Mobile network operators benefit from the lower load placed on the network.

Mobius unifies two seemingly contradictory design goals in the important context of mobile app development: making mobile programming easy, and achieving network frugality at the same time. The Mobius Client comes with an SDK which greatly aids mobile app development. No modifications are needed to the mobile operating system.

Figure 3:
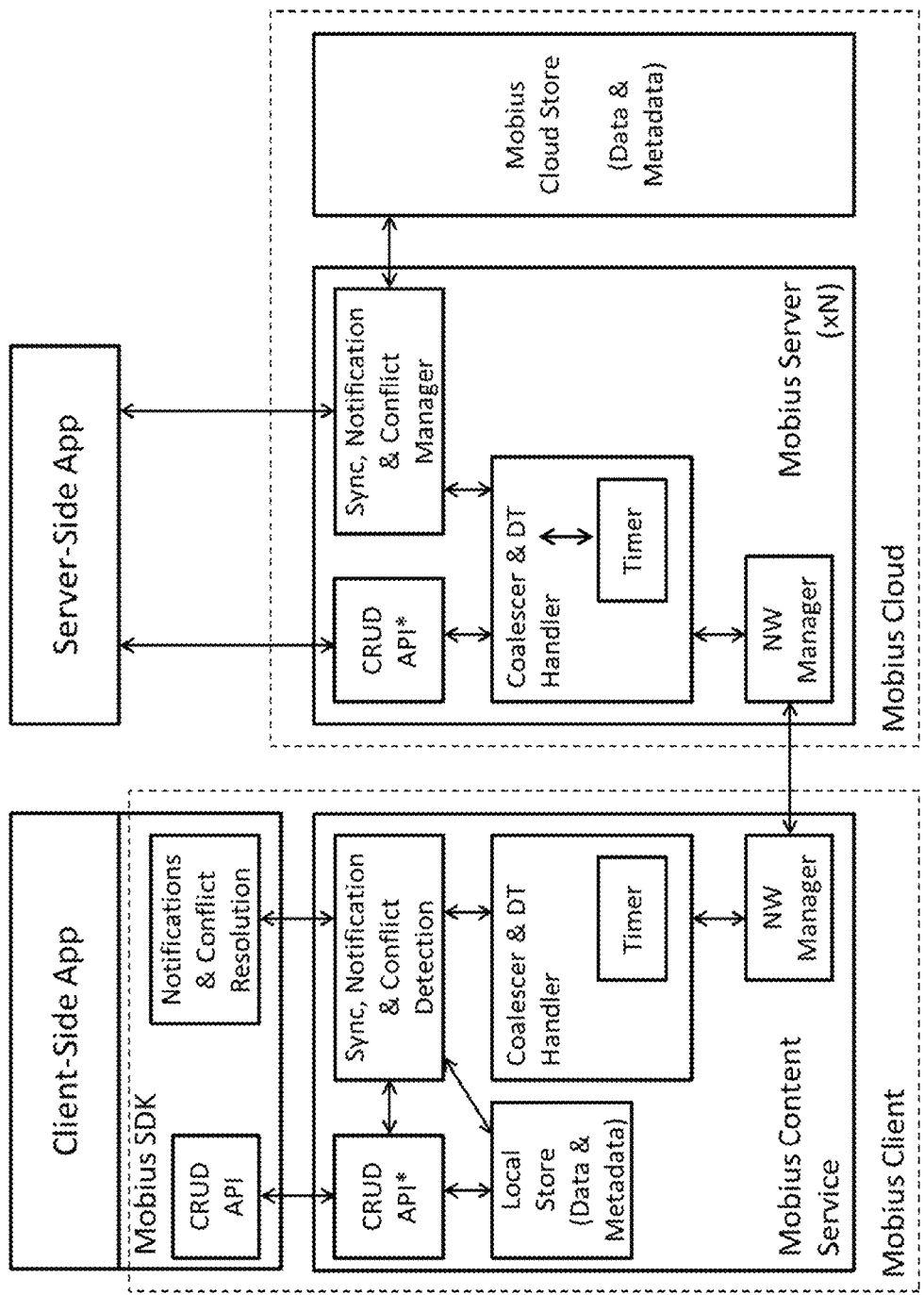
FIG. 3 shows an exemplary architecture for gracefully handling data centric mobile apps.

Mobius consists of software on the client (mobile device) and in the cloud, and allows development of mobile applications, or apps for short, running on the device; Mobius also allows the development of (optional) server-side applications. The architecture of Mobius is shown in FIG. 3.

The Mobius Client is responsible for interacting with the apps, and for exchanging messages with one of the Mobius Servers; it acts as a proxy for all device-to-cloud communication on behalf of all the Mobius apps on the device. The Mobius cloud consists of a scalable cloud store, Mobius Cloud Store, and a number of Mobius Servers. In addition to communicating with clients, the servers are responsible for storing data in Mobius Cloud Store and interacting with the server-side apps (if any). On the client, Mobius consists of two components: the Mobius SDK for developing mobile apps and the Mobius Content Service (MCS). MCS is implemented as an Android Service that provides an inter-process communication interface using Android IDL (AIDL). The Mobius SDK provides an application library that gets loaded with any app using the SDK; the library binds the app with the MCS. The API provided by the SDK is based on the familiar CRUD model, along with an API to well-defined semantics for data synchronization. The MCS is packaged as a regular user-level app on Android, no OS modifications are needed.

Internal to MCS is the Mobius Data Store (MDS) for locally storing all app data and Mobius metadata inside tables; the MDS is managed by MCS and is not directly accessible by Mobius apps. MCS contains a module responsible for synchronization of table data with the server, and for registering the app to be notified when data changes on the server. This component maintains relevant metadata to initiate and track the progress of sync messages; sync completion acknowledgments are received by it The Coalescer and the Delay-Tolerance (DT) Handler aggregate data and control messages across apps and schedule transfers in a delay-tolerant manner according to preferences specified per-table by the app. Additionally, it provides individual tables with the ability to be synchronized only on a network connection of their choice (e.g. sync only on WiFi). This component maintains timers for triggering various internal events such as initiating a transfer to the server when the delay tolerance of an operation is reached. The Network Manager is responsible for connecting to the cloud during MCS start, or for re-connecting after network or process failures; when this occurs, it also alerts the DT handler, in case any table is to be synced on the new connection type.

The Mobius Server mirrors most of the functionality of the client. The server maintains state related to all its clients, both connected and disconnected, to economize on control and data transfers; for example, to avoid sending duplicate data to the client, the server needs to maintain for every table the version number to which each client has been last synchronized with.

The Mobius SDK provides an API with CRUD and sync semantics—a programming model familiar to mobile app developers; complexities conflict detection, push notifications, and disconnected operations are hidden behind that interface. Second, Mobius allows apps to programmatically incorporate and benefit from tolerance to delay in the transfer of data between the mobile device and the cloud. Third, Mobius employs a number of data reduction techniques such as coalescing, compression, and piggybacking to reduce both the number of messages and bytes transferred over the network; the reduced number of messages contributes to a reduced number of radio transitions from off state to on. Fourth, by tapping into data transfers across apps, Mobius amplifies the benefits of the data reduction techniques. Finally, Mobius cloud mirrors the capabilities of the clients, and can additionally host the server component of the apps; server access to data is through a CRUD API similar to the client.

The Mobius SDK provides a simple API for mobile apps to store and synchronize data organized as database tables. The Mobius SDK provides an application library that gets loaded with any app using the SDK for it to communicate with MCS. All CRUD operations follow semantics familiar to mobile app developers for both the Android and iOS operating systems. Since the prototype is developed for Android, some of the implementation details in subsequent sections may be Android-specific, but the general concepts are equally applicable to other mobile OSes such as iOS. A simplified API is as follows:

CRUD createTable(table, schema, properties)
updateTable(table, properties)
dropTable(table)
writeData(table, data)
updateData(table, data, selection, selectionArgs)
readData(table, projection, selection, selectionArgs, sortOrder)
deleteData(table, selection, selectionArgs)
Table Synchronization registerPeriodicWriteSync(table, period, DT, syncpref)
unregisterPeriodicWriteSync(table)
writeSyncOneshot(table, DT)
subscribePeriodicReadSync(table, period, DT, syncpref)
unsubscribePeriodicReadSync(table)
readSyncOneshot(table)
Conflict Resolution beginCR(table)
getConflictedRows(table)
resolveConflict(table, row, choice)
endCR(table)

| Network State and Management |
| --- |
| authenticate(credentials)<br>registerDevice(token)<br>setGlobalSyncPref(read/write, syncpref) |

The first set of operations is CRUD operations to locally create, delete, and update a table, and operations on sets of rows within tables: write, update, read, and delete data. Write requests contain the table identifier and the data to be written. Read requests specify the table identifier, the table projection, the selection arguments to specify the WHERE clause, and a sort order for the resulting data. Row update and delete requests follow similarly.

In terms of implementation, the interface implements a ContentProvider—the standard method for inter-app data transfer in Android—to communicate with the Mobius apps. Read queries return a Cursor. A cursor is a popular abstraction for iterating through rows of a table. The cursor is backed by a CursorWindow that allows the client library to fetch data rows in bulk from MCS. Using a CursorWindow makes the inter-process communication between the client library and MCS more efficient; the client app does not need to make an inter-process call to fetch data for each row.

The second set of operations control table synchronization. A table can be registered for periodic write synchronization; changes made to the table locally are periodically sent to the Mobius server. A table subscribed for periodic read is refreshed by fetching data from the server. To avoid needless communication, the device only refreshes the data when the server notifies that the table contents have changed.

As part of the sync registration (or subscription), an app can specify a number of preferences on when and how to transfer data. Many apps can tolerate stale data and thus check for changes in data after fixed time intervals; for example, an RSS reader may read new feeds every 5 minutes. Apps can also tolerate some lag in the actual network transfer; the period and DT values control these parameters on a per-table basis. Period specifies the periodicity with which the tables are checked for changes; DT specifies the maximum time lag tolerated between change detection and network transmission. Mobius also provides each table with its own network sync preference for both reads and writes; an app has fine grained control over what data gets synced over a particular network.

As an example, a table registered with (period=600, DT=60, 3G) will be checked for changes every 600 seconds; once the changes are collected, the data will have a DT of up to 60 seconds for the network transfer to initiate. The above process is enabled when connected to a network with data costs lower than or equal to 3G (i.e., also on WiFi). Apps can also issue an on-demand read or write sync for a table irrespective of its periodic registration.

The client API also provides hints that can be used to optimize data synchronization, or to avoid synchronization entirely, for example, if an application needs to only store temporary local state. The API also exposes object versions; the system will be unable to resolve certain version conflicts when the same object is modified independently at more than one location.

Next, the Mobius Content Service (MCS) is discussed. MCS is the proxy for all device-to-cloud communication, hiding the complexities of network and data management from the apps. App requests are governed by MCS. Mobius apps first authenticate with MCS and then register two callbacks for receiving server notifications: the first for new data, and the second for conflicted data. One of the primary functions of MCS is also to provide persistent local data storage to the apps; MCS uses SQLite to store structured app data in a database format. MCS maintains internal metadata and augments the application tables with additional columns to store versions and identifiers. MCS also manages the synchronization preferences for tables across apps. Each app in Mobius has its own table namespace and does not automatically share it with other apps; MCS provides security and application isolation.

When an app registers a table for read or write synchronization, it provides a period and a DT for the synchronization. Periodicity allows for multiple changes to be absorbed locally before initiating a transfer; larger periods also reduce the client load on the server. For write synchronization, the period controls the frequency of checking for changes of the table on the client. The period for read synchronization determines the frequency with which the Mobius Cloud checks for changes on a table on behalf of the client, notifying the client in case there are pending changes. DT is complementary to the period and is valid even for aperiodic apps. Once a network transfer is initiated for data or control messages, DT enables the transfer to become resource friendly; for example, by not immediately waking the cellular radio. Individual periodic apps do not benefit much from DT since the period is enough to buffer changes. However, most mobile users do not run a single app. Typically, many apps run in the background as services, for example to send/receive email, update weather, synchronize RSS feeds and news, and update social networking status. Background apps on mobile devices are usually configured to fetch new data from cloud services periodically or on receipt of push notifications. MCS is designed to work across multiple apps running simultaneously.

Since the apps operate independent of each other, their periods need not align. For multiple periodic and aperiodic (e.g., photo upload, email, document syncing) apps running on the same device, DT enables coalescing the traffic across the apps even when their periods are staggered. For apps with aperiodic data transfers, DT creates additional opportunities for cross-app data reduction and optimizations. For example, if a user writes a note and then sends an email or another note after one minute, the data is synced together to the cloud if the note app is tolerant to a delay of more than a minute.

Next, the Mobius Data Store (MDS) is discussed. MCS creates and maintains the MDS on a client device for all Mobius apps; while the prototype uses Android's native database (i.e., SQLite), MCS can work with any database.

When a client app submits a query, MCS issues it to obtain a cursor; it then fills the cursor window with the cursor, subsequently passing the cursor window to the clientlib using IPC. The client lib converts the cursor window back a cursor for the client app. Another challenge is to handle short reads. If the client discards, the server will have to resend everything. Even when the connection is alive, if the message is large enough, the TCP window closes, forcing short reads.

Next the Client and Server communication is discussed. The data synchronization protocol between MCS and the Mobius server is different from the Mobius API as described in Table 1. Write (client to server) synchronization is performed differently from read (server to client) synchronization. For writes, MCS pushes versioned rows of data to the server, which responds by indicating whether the change for each of the rows was accepted, or resulted in a conflict. For reads, the server first initiates communication by notifying the client that there are changes pending to be read. Then, the client pulls the changes and reconciles them with the local state. Version management and conflict resolution is described later in Section 5. The schema for creating a table is transferred to the server when any one of the clients register the table for synchronization or perform a one-time sync. This way table creations do not have to be reported to the server unnecessarily.

In addition to data synchronization, the client and server also exchange other control messages for managing read subscription, table manipulation, etc. We use sequence numbers to allow asynchronous remote calls. Off-the-shelf RPC frameworks for client-server communication are not amenable to the delay-tolerant scheduling, so Google Protobuf can be used for message serialization and implemented the data communication layer. Protobuf provides an easy way to specify protocol messages and encodes the data more efficiently than standard Java serialization.

Figure 4:
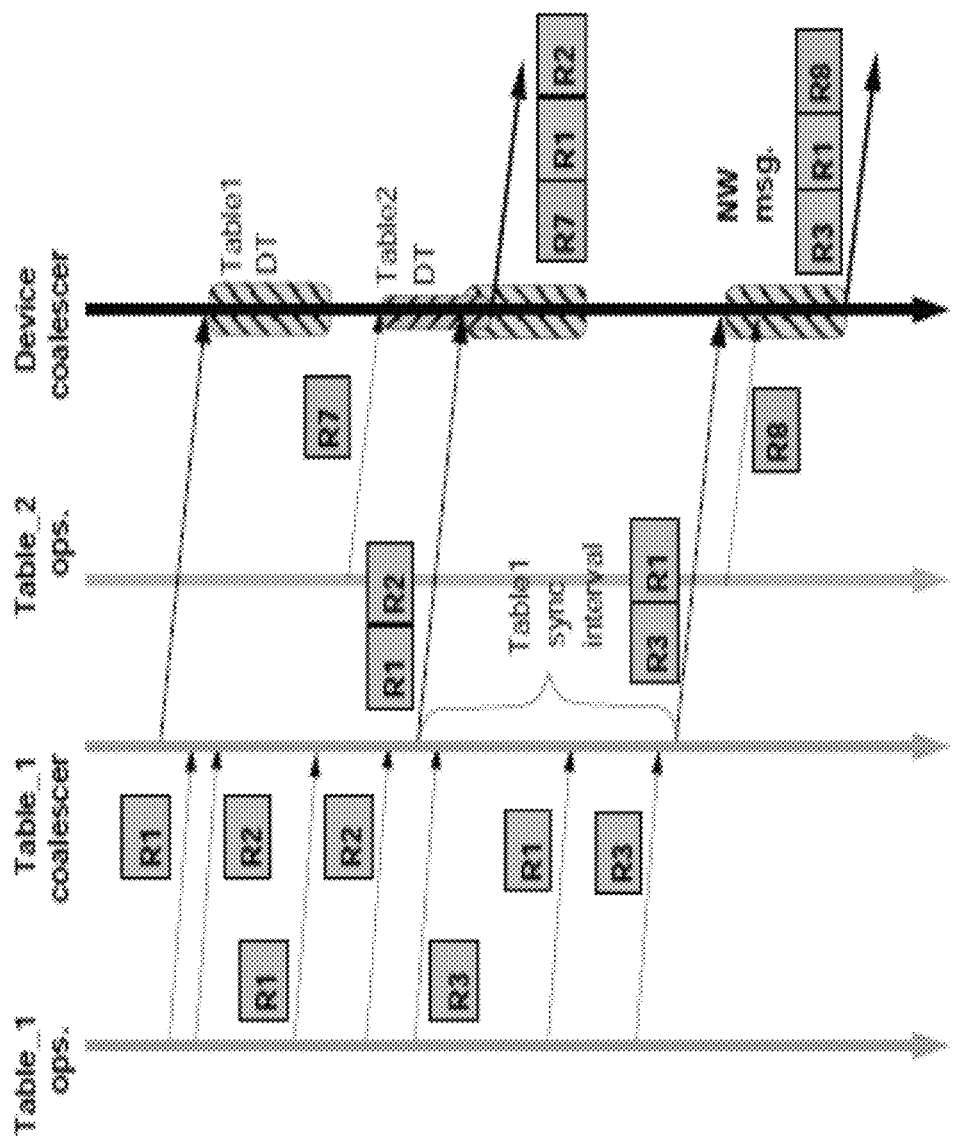
FIG. 4 shows an exemplary illustration in transferring data and control messages, in particular periodic sync and delay tolerance.

Next delay tolerance (DT) is discussed. Many apps have some tolerance to stale data; if exploited properly, this property can provide a more efficient usage of the network. Mobius provides delay-tolerant transfer of all application data. Mobius tables registered for periodic synchronization can be specified a per-table DT value. As an example, FIG. 4 shows the processing of requests made to two tables: table has enabled periodic sync, and table has not; both are delay tolerant, with a per-table limit. The periodicity of table first results in coalescing of its own data; subsequently, this data gets sent to the device coalescer on a periodic sync. Since table is specified with some DT, it sits waiting in the device coalescer, and gets aggregated with the data from table. MCS then applies data reduction techniques to the aggregated data and sends out over the network. MCS also maintains timers to trigger the collection of changes from tables registered for periodic sync. The DT Scheduler in MCS is responsible for scheduling the transfer of all write data and read requests from the client, in accordance with the DT values.

The Mobius server contains similar timer management for notifying clients of changes to tables; the server has to maintain information on a per-device basis since its intent is to send a single notification for changes across all tables registered by any client. Since not all tables are subscribed to by all clients, the server organizes the timers first per-client, and then per-period.

A Mobius Timer is a single threaded timer that can contain and trigger multiple timer tasks, one for each table assigned to the timer. Each timer is responsible for one period, corresponding to the sync period of registered tables and is shared amongst all tables with the same period. To enable synchronization across tables, timers are always triggered from the reference of wall-clock time and not from the reference of individual tables. All tables sharing the same period get added to the timer at the time of their respective sync registration.

During the registration of a timer task, the Timer Manager calculates the jitter between the current wall-clock time and the next scheduled trigger of that timer; the table is then attached to the timer at the next synchronization time point.

For example, when a table with a period of seconds is registered at time, the next scheduled trigger of the corresponding timer will be at. The table is thus registered with an initial timer set to trigger after seconds, and is subsequently aligned with the second timer firing at, and so on.

Separate timers for different periods can still go out of sync with each other; for example, ideally a second timer and a second timer should both fire together at the second.

Mobius compresses data and control messages where possible. A simple entropy test is used to determine the potential for compression since it has a direct impact on battery consumption for mobile devices; the entropy test is relatively cheap compared to the compression itself.

Mobius provides an efficient notification mechanism for informing clients of updated data available on the server; the client is free to pull the data from the server when it sees fit. Notification is not guaranteed to succeed (e.g., client is disconnected), but notification failures are recorded by the server. Notifications are sent over the same persistent connection established by the client. The notification contains information about all the tables that are part of the change set, for the client to be able to pull data selectively on a per-table basis (i.e., the client has the ability to pull only a subset of tables that have changed). Sending a list of all table IDs on every notification increases the size of the notify message; as an optimization, the server sends only a bitmap of the tables to the client. The order in the bitmap is the order of table creation and thus known to both the client and the server; each table having an update is set to one in the bitmap.

Next, adaptive transfer is discussed. Different wireless networks provide a range of cost, performance, and energy consumption trade-offs. Most mobile users prefer to control the amount of data transferred over 3G/4G networks and many apps provide a setting to allow sync only over WiFi. Currently, such an option has to be provided and applied to every app. the colleagues in the sensor data project specifically desired per-table adaptivity since in their case, not all data within an app was to be treated the same and the cost of cellular data was to be kept within a budget. With Mobius, an app (and its user) has fine grained control over what gets synced over a particular network. Mobius provides each table with its own network sync preference for both reads and writes; apps specify the sync preference along with the table registration. Users have ultimate control by specifying system-wide preferences to override individual app preferences through the Mobius app.

When the timer manager collects dirty data from the list of tables that have been updated, it excludes the ones for which the network sync preference does not allow transfer on the particular network connection at the time. For tables registered for a read sync, upon receiving a notification of changes from the server, the read message handler pulls data only from the tables that have the appropriate sync preference set.

Additional resource savings are possible through increased cooperation between the client and the server; for example, a custom protocol can increase the effectiveness of client-delegated storage through exclusive caching or more efficient duplicate elimination.

The servers maintain soft state for each client, state that can be re-created, if servers fail, from stored metadata and information supplied by clients at re-connection. Additionally, Mobius provides a server-side API that developers can use to write applications that access client's data in the cloud.

Although the communication between a client and a server is stateful, the state of that connection is not affected by the communication generated by other clients. Thus, the Mobius server work is easily parallelizable and does not cause scalability problems. Note however, that Mobius relies on the underlying cloud store to be scalable.

Mobius supports concurrency control through row-level versioning. Additionally, the implementation attempts to minimize the amount of data exchanged between client and server, especially for the common case of non-conflicting writes. To achieve this goal, the server maintains some metadata in the underlying store.

The first such metadata is a last-synced version number per client per table; by comparing it with the version contained in the read request we can avoid sending to the client rows with versions that have already been seen by that client. Since a client communicates to only one server, this metadata can be safely cached on the server for reads, and written-through to the cloud store when updated.

The second metadata is a last writer for each row. Remember that an updated row gets a version number at the server, not at the client. When the client performs a read sync, the client does not have version numbers for locally modified rows; using the last writer information, the server can detect that the client has the correct data for some of those rows, and avoids transferring back that data.

A simple implementation of last writer is to add an extra column to every table to store this information. However, such a design incurs a significant storage overhead on the server, with implications also to performance. Instead, based on the observation that typically modifications to a row are done in sequence by the same client, we use an interval table with ranges of rows and the client ID responsible for the last modification to those rows. This scheme incurs much less space overhead than the simple implementation, approaching the latter only in the extreme case of no writer managing to make more than one update in sequence (because of heavily concurrent modifications).

Mobius provides a server API that is used to build applications hosted in the Mobius Cloud. The API provides developers with methods to: access the data stored in the cloud; methods to register notifications to the client regarding changes to a table, thus avoiding expensive polling on the clients; methods to register notifications to the server application regarding changes to a table, to avoid polling on the server. Access to the cloud store is provided through a CRUD-like interface. The service developers need not worry about communicating with the client to transfer data, this is handled by Mobius. One embodiment of the server API uses Thrift, which provides an efficient cross-language RPC mechanism.

In sum, the Mobius system provides a mobile app development and hosting platform. Mobius provides an easy to use SDK for developing data-oriented mobile apps; it also provides well-defined semantics for data storage and synchronization. Mobius is frugal with resource consumption, applying coalescing and data reduction techniques to reduce the number of messages and bytes exchanged between the client and the server. Mobius unifies the seemingly contradictory design goals of making mobile programming easy and at the same time achieving network frugality.

What is claimed is:

1. A method to communicate data in a mobile application, comprising:
    specifying in the mobile application a program intent and one or more course or fine-grained properties of data objects in terms of tolerance to delay and loss;
    providing a Mobile Application Programming Interface (API) for writing apps for mobile devices that allows an application to specify the course or fine-grained properties of data objects in terms of their tolerance to delay and loss and to handle asynchronous events generated as a result of a data item being transferred or lost, if a notification is desired by the application;
    using a network transfer protocol between a mobile device and a cloud service to coalesce intents of multiple applications for individual data objects or for and aggregate and to decide on a transfer policy for a set of data objects based on application intent;
    capturing factors including network type, network characteristics, server load, and system-wide metrics of interest for the network transfer protocol to determine a schedule of when and what data objects to transfer;
    performing optimizations to efficiently transfer data based on type of data and system-wide parameters and creating a window of opportunity through delay to pack data objects into a single transfer with opportunities for applying deduplication and compression;
    dynamically setting a delay in a fine-grained manner on individual collections of data by a mobile app;
    providing client-side software on the mobile device for the API and the client-side component of the network transfer protocol and a server-side software running as a cloud service that implements a server-side component of the network transfer protocol,
    wherein the server side software mirrors the client-side software for delay and loss tolerant data transfer for the downstream traffic to transfer data from server to client; and
    selecting a transfer policy for a set of data objects based on the application intent.

2. The method of claim 1, comprising handling events generated as a result of a data item being transferred, delayed, or lost, if a notifications desired by the application.

3. The method of claim 1, wherein the transfer policy comprises network type, network characteristics, server load, or system-wide metric of interest.

4. The method of claim 1, comprising sending instruction for data to be discarded on the server-side if the application can tolerate loss of that data.

5. The method of claim 1, comprising connecting multiple writers (mobile devices) operating on the same table.

6. The method of claim 1, comprising operating a cloud service that interprets a custom network protocol and interprets application intents.

7. The method of claim 1, comprising reducing data through coalescing, compression, deduplication, and piggybacking to reduce the number of messages and bytes transferred over a network, based on a transfer policy.

8. The method of claim 1, comprising specifying predetermined data type (tables) to sync over a particular network by providing each table with its own network sync preference for reads and writes, wherein each app specifies a sync preference with a table registration.

9. The method of claim 1, comprising receiving and coalescing intents of multiple applications for object data for the multiple applications; and crafting an aggregate transfer policy.

10. The method of claim 1, comprising communicating data from multiple applications as an aggregate based on the aggregate transfer policy to programmatically incorporate and benefit from tolerance to delay in the transfer of data.

11. The method of claim 1, comprising sending instruction for loss-tolerant data to be discarded on a server-side.

12. A system to communicate data in a mobile application, comprising
    a processor; and
    memory containing computer readable code for:
        specifying in the mobile application a program intent and one or more course or fine-grained properties of data objects in terms of tolerance to delay and loss;
        providing a Mobile Application Programming Interface (API) for writing apps for mobile devices that allows an application to specify the course or fine-grained properties of data objects in terms of their tolerance to delay and loss and to handle asynchronous events generated as a result of a data item being transferred or lost, if a notification is desired by the application;
        using a network transfer protocol between a mobile device and a cloud service to coalesce intents of multiple applications for individual data objects or for and aggregate and to decide on a transfer policy for a set of data objects based on application intent;

capturing factors including network type, network characteristics, server load, and system-wide metrics of interest for the network transfer protocol to determine a schedule of when and what data objects to transfer;

selecting a transfer policy for a set of data objects based on the application intent;

receiving and coalescing intents of one or more applications for object data for the one or more applications;

crafting an aggregate transfer policy, and communicating data from one or more applications as an aggregate based on the aggregate transfer policy to programmatically incorporate and benefit from tolerance to delay in the transfer of data.

13. The system of claim 12, comprising computer readable code for handling events generated as a result of a data item being transferred, delayed, or lost, if a notification is desired by the application.

14. The system of claim 12, wherein the transfer policy comprises network type, network characteristics, server load, or system-wide metric of interest.

15. The system of claim 12, comprising computer readable code for sending instruction for loss-tolerant data to be discarded on the server-side.

16. The system of claim 12, comprising computer readable code for connecting multiple disconnected writers to one table.

17. The system of claim 12, comprising computer readable code for operating a cloud service that interprets a custom network protocol and interprets application intents.

18. The system of claim 12, comprising computer readable code for reducing data through coalescing, compression, and piggybacking to reduce the number of messages and bytes transferred over a network, based on a transfer policy.

19. The system of claim 12, comprising computer readable code for aggregating intents across several mobile applications, each of which individually may have no or limited benefit from delay and loss tolerance.

20. The system of claim 12, comprising computer readable code for specifying predetermined data type (tables) to sync over a particular network by providing each table with its own network sync preference for reads and writes, wherein each app specifies a sync preference with a table registration.

* * * * *